(12) United States Patent
Skurkis et al.

(10) Patent No.: US 9,797,463 B1
(45) Date of Patent: Oct. 24, 2017

(54) PASSIVE REGULATION OF CONVECTIVE COOLING

(71) Applicant: GM GLOBAL TECHNOLOGY OPERATIONS LLC, Detroit, MI (US)

(72) Inventors: Richard J. Skurkis, Lake Orion, MI (US); Paul W. Alexander, Ypsilanti, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/164,202

(22) Filed: May 25, 2016

(51) Int. Cl.
*B60T 5/00* (2006.01)
*F16D 65/847* (2006.01)
*F16D 65/78* (2006.01)

(52) U.S. Cl.
CPC .............. *F16D 65/847* (2013.01); *B60T 5/00* (2013.01); *F16D 2065/781* (2013.01); *F16D 2065/783* (2013.01)

(58) Field of Classification Search
CPC ............. F16D 65/847; F16D 2065/781; F16D 2065/783; B60T 5/00
USPC .... 188/264 AA, 264 A, 71.6, 264 R, 218 A; 180/68.1–68.3; 280/727, 855
See application file for complete search history.

(56) References Cited

U.S. PATENT DOCUMENTS

| | | | | |
|---|---|---|---|---|
| 4,772,299 A * | 9/1988 | Bogusz | .................. | B01D 45/04 188/264 AA |
| 4,810,021 A * | 3/1989 | Burst | ........................ | B60T 5/00 296/180.1 |
| 7,198,139 B2 * | 4/2007 | Wilson | .................... | F16D 65/78 188/264 AA |
| 7,600,615 B2 * | 10/2009 | Ramsay | .................... | B60T 5/00 188/264 AA |
| 8,474,557 B2 * | 7/2013 | Wolf | ........................ | B60T 5/00 180/68.1 |
| 8,562,023 B2 * | 10/2013 | Hino | ....................... | B60C 23/18 165/104.19 |
| 8,678,426 B1 * | 3/2014 | Browne | ................ | F16D 65/847 165/44 |
| 9,004,241 B2 * | 4/2015 | Browne | ................ | F16D 65/847 188/264 A |

(Continued)

*Primary Examiner* — Thomas J Williams
*Assistant Examiner* — Mariano Sy
(74) *Attorney, Agent, or Firm* — Quinn IP Law (57) ABSTRACT

A passive airflow regulation system for controlling temperature of a heat-absorbing subassembly is disclosed. The passive airflow regulation system includes a duct configured to provide a conduit for an incident ambient airflow to the heat-absorbing subassembly. The duct is arranged proximate to the heat-absorbing subassembly. The airflow regulation system includes a valve configured to control passage of the incident ambient airflow through the duct. The airflow regulation system also includes an actuator employing a phase-change element configured to selectively store and release energy in response to changes in temperature and stress. The actuator is arranged at the heat-absorbing subassembly and configured to select a position for the valve between and inclusive of fully-opened and fully-closed in response to a temperature of the heat-absorbing subassembly. The airflow regulation system can be arranged on a vehicle having a vehicle body including a first body end configured to face the incident ambient airflow.

16 Claims, 6 Drawing Sheets

(56) References Cited

U.S. PATENT DOCUMENTS

2010/0258385 A1* 10/2010 Sabelstrom .............. B60T 5/00
  188/71.6
2016/0025164 A1* 1/2016 Watarai .................. F16D 65/12
  188/218 XL

* cited by examiner

PASSIVE REGULATION OF CONVECTIVE COOLING

TECHNICAL FIELD

The present disclosure relates to passive regulation of airflow for convective cooling of various systems and heat-absorbing devices.

BACKGROUND

Heat is transferred by convection in numerous examples of naturally occurring fluid flow, such as wind, oceanic currents, and movements within the Earth's mantle. Convection is also used in engineering practices of homes, industrial processes, cooling of equipment, and other devices.

The rate of convective heat transfer may be improved by the use of forced airflow over a heat-absorbing device to ensure operating temperature of the device is kept within tolerable limits. One example of such a heat-absorbing device can be a friction brake as typically employed in automobiles for deceleration thereof. Another example of such a heat-absorbing device can be a processor of a computer or a heatsink specifically mounted to the processor.

SUMMARY

A passive airflow regulation system for controlling temperature of a heat-absorbing subassembly is disclosed. The passive airflow regulation system includes a duct configured to provide a conduit for an incident ambient airflow to the heat-absorbing subassembly. The duct is arranged proximate to the heat-absorbing subassembly. The airflow regulation system includes a valve configured to control passage of the incident ambient airflow through the duct. The airflow regulation system also includes an actuator employing a phase-change element configured to selectively store and release energy in response to changes in temperature and stress. The actuator is arranged at the heat-absorbing subassembly and configured to select a position for the valve between and inclusive of fully-opened and fully-closed in response to a temperature of the heat-absorbing subassembly.

The system actuator can be a wax motor and the phase-change element can be a wax.

The phase-change element can be formed from a shape memory alloy (SMA).

The phase-change element can be operatively connected to the valve and configured to selectively extend and contract in response to the temperature of the heat-absorbing subassembly and a bias spring configured to generate a bias force. The bias force of the bias spring can be configured to counter one of expansion and contraction of the phase-change element.

The phase-change element can be configured as a coil arranged in series with the bias spring. Alternatively, the phase-change element can be configured as a series of coils arranged in series with one or more bias springs.

The actuator can include at least one pulley and the phase-change element can be configured as a wire extending around the at least one pulley.

The at least one pulley can include a first pulley and a second pulley. In such a case, the first and the second pulleys can each be configured to change a directional path and of the wire.

The actuator can include a housing configured to mount and retain the phase-change element, the bias spring, and the at least one pulley therein.

The passive airflow regulation system can be arranged on a vehicle having a vehicle body including a first vehicle body end configured to face the incident ambient airflow. The vehicle can include a road wheel, and the heat-absorbing subassembly can be a brake assembly configured to decelerate the vehicle via retarding rotation of the road wheel.

The brake assembly can include a brake rotor configured to rotate with the road wheel and a brake rotor shield arranged proximate to the rotor and fixed relative to the vehicle body. In such a case, the actuator can be mounted to the brake rotor shield.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
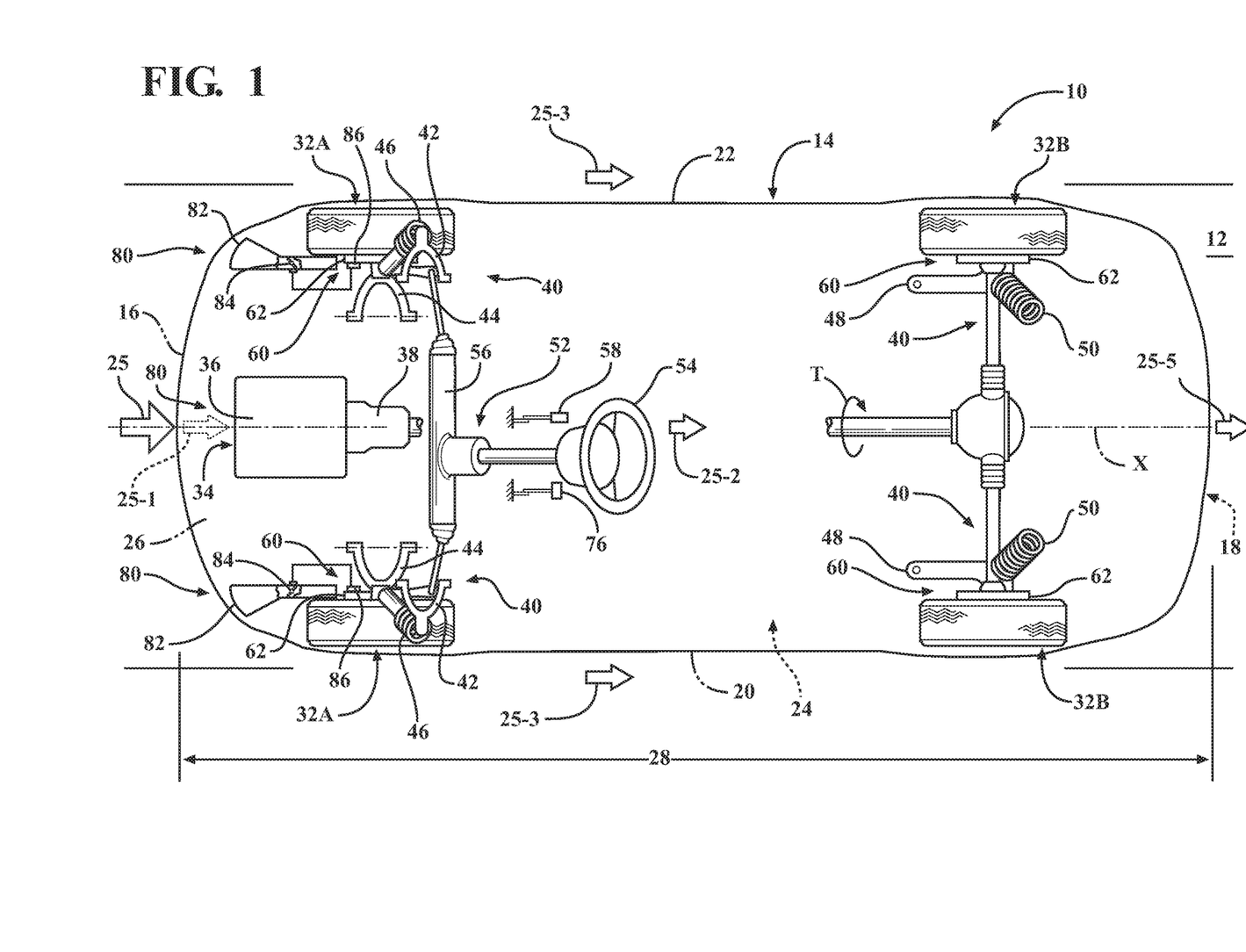
FIG. 1 is a schematic plan view of a motor vehicle having a number of heat-absorbing subassemblies and a passive airflow regulation system with an actuator employing a phase-change element for actuating a valve used to direct an incident airflow to components of the heat-absorbing subassemblies according to the disclosure.

Referring to the drawings, wherein like reference numbers refer to like components, FIG. 1 shows a schematic view of a motor vehicle 10 positioned relative to a road surface 12. The vehicle 10 could be any mobile platform, such as a passenger vehicle, an ATV, an airplane, etc., used for any personal, commercial, or industrial purpose.

As shown, the vehicle 10 includes a vehicle body 14 having a longitudinal axis X. The vehicle body 14 defines six body sides. The six body sides include a first body end or front end 16, an opposing second body end or rear end 18, a left side 20, a right side 22, and a top body section 24, which frequently includes a vehicle roof, and an underbody section 26 (shown in FIG. 3). As understood by those skilled in the art, the front end 16 is configured to face oncoming or incident, i.e., approaching and contacting, ambient airflow 25, for example when the vehicle is in motion relative to the road surface 12.

As shown in FIG. 1, the underbody section 26 is configured to span a distance 28 between the front and rear ends 16, 18 of the body 14. The underbody section 26 also defines an unoccupied space between the vehicle body 14 and the road surface 12 (not shown but understood by those skilled in the art). Accordingly, the space between the vehicle body 14 and the road surface 12 permits a first or underbody airflow portion 25-1 to pass under the vehicle body 14, between the vehicle body 14 and the road surface 12, while a second airflow portion 25-2 passes over the top body section 24. Furthermore, a third airflow portion 25-3 passes around the left and right sides 20, 22. The airflow portions 25-1, 25-2, and 25-3 all rejoin behind the rear end 18 in a wake area or recirculating airflow region 25-5 immediately behind the rear end 18 of the moving vehicle. As understood by those skilled in the art, the recirculating airflow region 25-5 is generally caused at elevated vehicle speeds by the flow of surrounding air around the body sides 18, 20, 22, 24, and 26.

Figure 3:
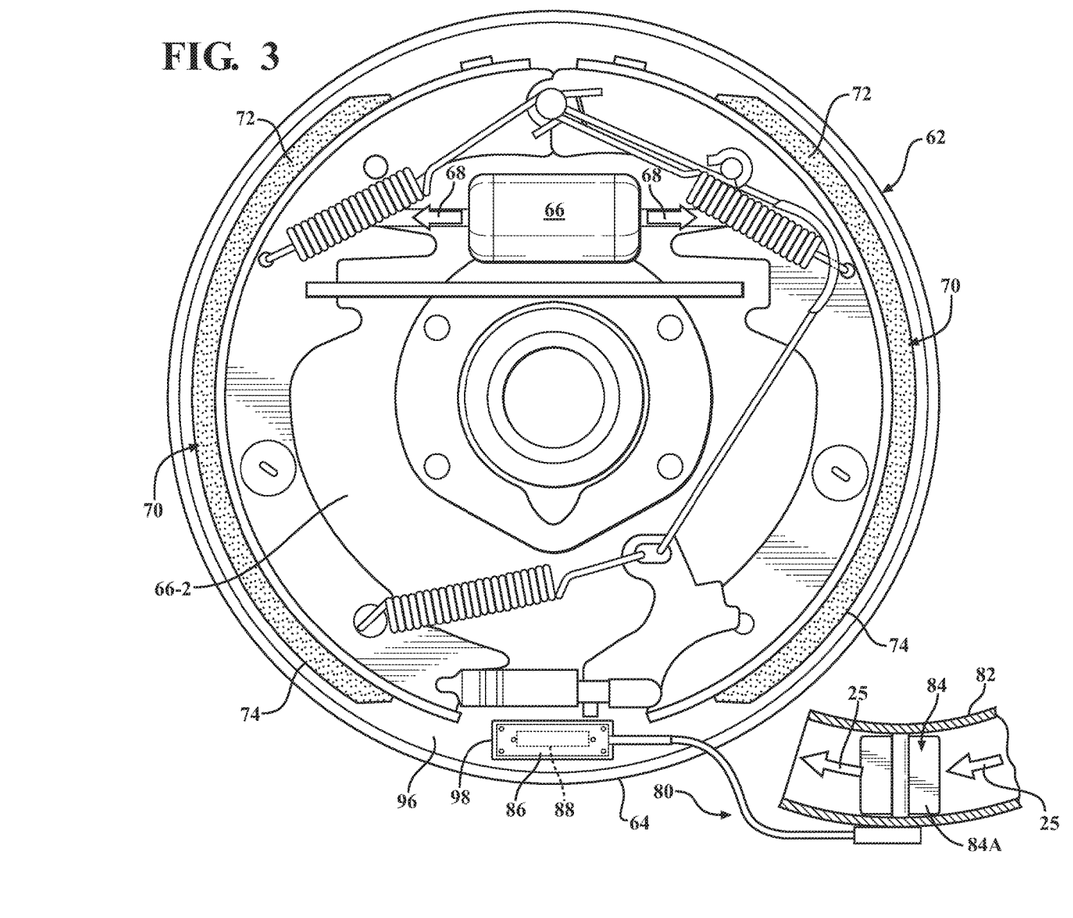
FIG. 3 is a schematic side view of a drum brake embodiment of the brake subassembly that is one of the heat-absorbing subassemblies shown in FIG. 1, wherein the actuator is mounted to a drum brake rotor backing plate, and the valve is depicted in a fully-closed state.

With reference to FIGS. 1 and 3, the vehicle 10 includes a plurality of road wheels, specifically front wheels 32A and rear wheels 32B, and a powertrain 34 that may include an internal combustion engine 36 for generating engine torque T. The powertrain 34 can also include a transmission 38 operatively connecting the engine 36 to at least some of the road wheels 32A, 32B for transmitting engine torque T thereto. The powertrain 34 can additionally include a fuel cell and/or one or more electric motor-generators (not shown) operatively connected to at least some of the road wheels 32A and 32B.

As shown, a vehicle suspension system 40 operatively connects the body 14 to the respective road wheels 32A and 32B for maintaining contact between the wheels and a road surface, and for maintaining handling of the vehicle. The suspension system 40 may include an upper control arm 42, a lower control arm 44, and a strut 46 connected to each of the front wheels 32A, 32B. The suspension system 40 may also include a trailing arm 48 and a spring 50 connected to each of the rear wheels 32A, 32B. Although a specific configuration of the suspension system 40 is shown in FIG. 1, other vehicle suspension designs are similarly envisioned.

As shown in FIG. 1, a vehicle steering system 52 is operatively connected to the front wheels 32A for steering the vehicle 10. The steering system 52 includes a steering wheel 54 that is operatively connected to the front wheels 32A via a steering rack 56. The steering wheel 54 is arranged inside the passenger compartment of the vehicle 10, such that an operator of the vehicle may command the vehicle to assume a particular direction with respect to the road surface. Additionally, an accelerator pedal 58 is positioned inside the passenger compartment of the vehicle 10, wherein the accelerator pedal is operatively connected to the powertrain 34 for commanding propulsion of the vehicle 10.

As shown in FIG. 1, the vehicle 10 also includes one or more heat-absorbing subassemblies. Such heat-absorbing subassemblies can include various electric motors employed for various actuation purposes in the vehicle 10, the engine 36, and the transmission 38. An exemplary heat-absorbing subassembly can also be a vehicle braking system 60 operatively connected to the respective front and rear wheels 32A, 32B for retarding rotation of the wheels and decelerating the vehicle 10. Although the heat-absorbing subassembly can be a variety of vehicle devices and subassemblies, for representative purposes the remainder of the present disclosure will concentrate on the braking system 60 as the subject heat-absorbing subassembly.

The braking system 60 includes a friction brake subassembly 62 arranged at each of the respective front and rear wheels 32A, 32B. Each brake subassembly 62 may be configured as either a disc brake (shown in FIG. 2) or a drum brake (shown in FIG. 3). Each brake subassembly 62 includes a rotor 64 configured for synchronous rotation with the respective wheel 32A or 32B. Rotor material is generally selected for advantageous friction and wear characteristics, as well as effective heat resistance. Typically, rotors are formed out of cast iron, but may in some cases be made of composites such as reinforced carbon-carbon or ceramic matrix composites. Each brake subassembly 62 additionally includes an actuator 66, such as a hydraulically activated piston arranged in a brake caliper 66-1 of a disc brake (shown in FIG. 2) or in a foundation 66-2 of a drum brake (shown in FIG. 3), and configured to generate an actuator force 68.

Figure 2:
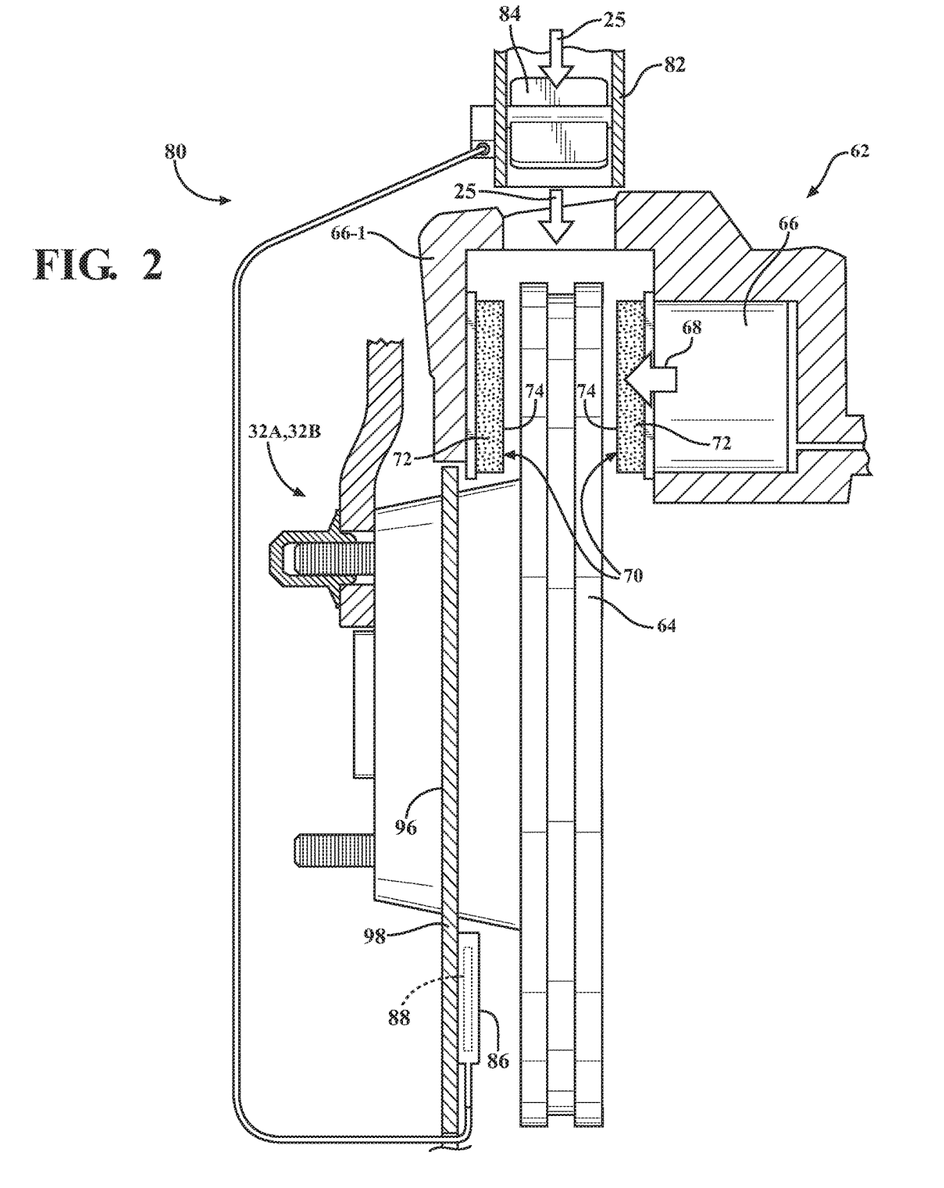
FIG. 2 is a schematic cross-sectional view of a disc brake embodiment of a brake subassembly that is one of the heat-absorbing subassemblies shown in FIG. 1, wherein the brake subassembly is configured as a disc brake and the actuator is mounted to a disc brake rotor shield, and the valve is depicted in a fully-opened state.

As shown in FIGS. 2 and 3, each brake subassembly 62 also includes a brake component 70 having a wearable friction lining or segment 72. The friction segment 72 additionally includes a friction surface 74 that becomes pressed into contact with the rotor 64 by the actuator force 68 for retarding rotation of the respective wheel 32A or 32B. Typically, friction segments are composed of relatively soft but tough and heat-resistant materials having a high coefficient of dynamic friction, and, ideally an identical coefficient of static friction. The friction segment 72 is the portion of the brake subassembly 62 which converts the vehicle's kinetic energy into thermal energy that is initially largely absorbed by the rotor 64 and subsequently given off via radiation and/or convection to the ambient. Such absorption of thermal energy may cause excessive wear on the friction segment 72 and the rotor 64, thermally induced dimensional distortion of the rotor, and brake fade, i.e., a decrease in the brake's stopping power.

The complete brake component 70 (including the friction segment 72) is typically called a "brake pad" or "brake shoe". As shown in FIG. 2, if the brake subassembly 62 is configured as a disc brake, the rotor 64 is configured as a disc rotor and the brake component 70 is correspondingly configured as a disc brake pad. As shown in FIG. 3, if the brake subassembly 62 is configured as a drum brake, the rotor 64 is configured as a brake drum and the brake component 70 is correspondingly configured as a drum brake shoe.

As shown in FIG. 2, in a disc brake, the caliper 66-1 is generally configured to hold a pair of braking components 70, i.e., brake pads, relative to the rotor 64, i.e., disc rotor, and apply the actuator force 68 to the brake pads in order to squeeze the disc rotor for decelerating the vehicle 10. As shown in FIG. 3, in a drum brake, a pair of brake components 70, i.e., brake shoes, are generally held inside the rotor 64, i.e., drum, and the actuator 66 applies the actuator force 68 to press the brake shoes against a perimeter of the inner surface of the drum to decelerate the vehicle 10. Additionally, in each case, of disc and drum brakes of FIGS. 2 and 3, respectively, the actuator force 68 is controlled via a brake pedal 76 (shown in FIG. 1). The brake pedal 76 is positioned inside the passenger compartment of the vehicle 10, and is adapted to be controlled by the operator of the vehicle.

As shown in FIGS. 1-3, the vehicle 10 also includes a passive airflow regulation system 80. The passive airflow regulation system 80 includes a duct 82 arranged on the vehicle body 14 and configured to provide a conduit for the incident ambient airflow 25 to the heat-absorbing subassembly, e.g., the brake subassembly 62. Accordingly, the duct 82 is arranged proximate to the brake subassembly 62. The passive airflow regulation system 80 also includes a valve 84 configured to control passage of the incident ambient airflow 25 through the duct 82. The valve 84 can be configured as an airflow shutter having one or more louvers 84A. The passive airflow regulation system 80 also includes an actuator 86 employing a phase-change element 88, i.e., an element constructed from a phase-change material.

As employed herein, a "phase-change" material is the type that can exist in different phases—having different microstructural and functional properties at different temperatures—and is able to transform from one phase to the other as a result of a change in temperature and stress affecting the material. Phase-change materials or substances are typically capable of selectively storing and releasing large amounts of energy. For example, such storing and releasing of energy can take place when the material changes from solid to liquid and vice versa while melting and solidifying at a certain temperature. Also, storing and releasing of energy can take place in a material with "shape memory", where the material absorbs energy when deformed and releases energy by returning to its pre-deformed shape when heated. Accordingly, the phase-change element 88 is configured to transform from one phase to the other as a result of the change in temperature and stress affecting the element.

Figure 4:
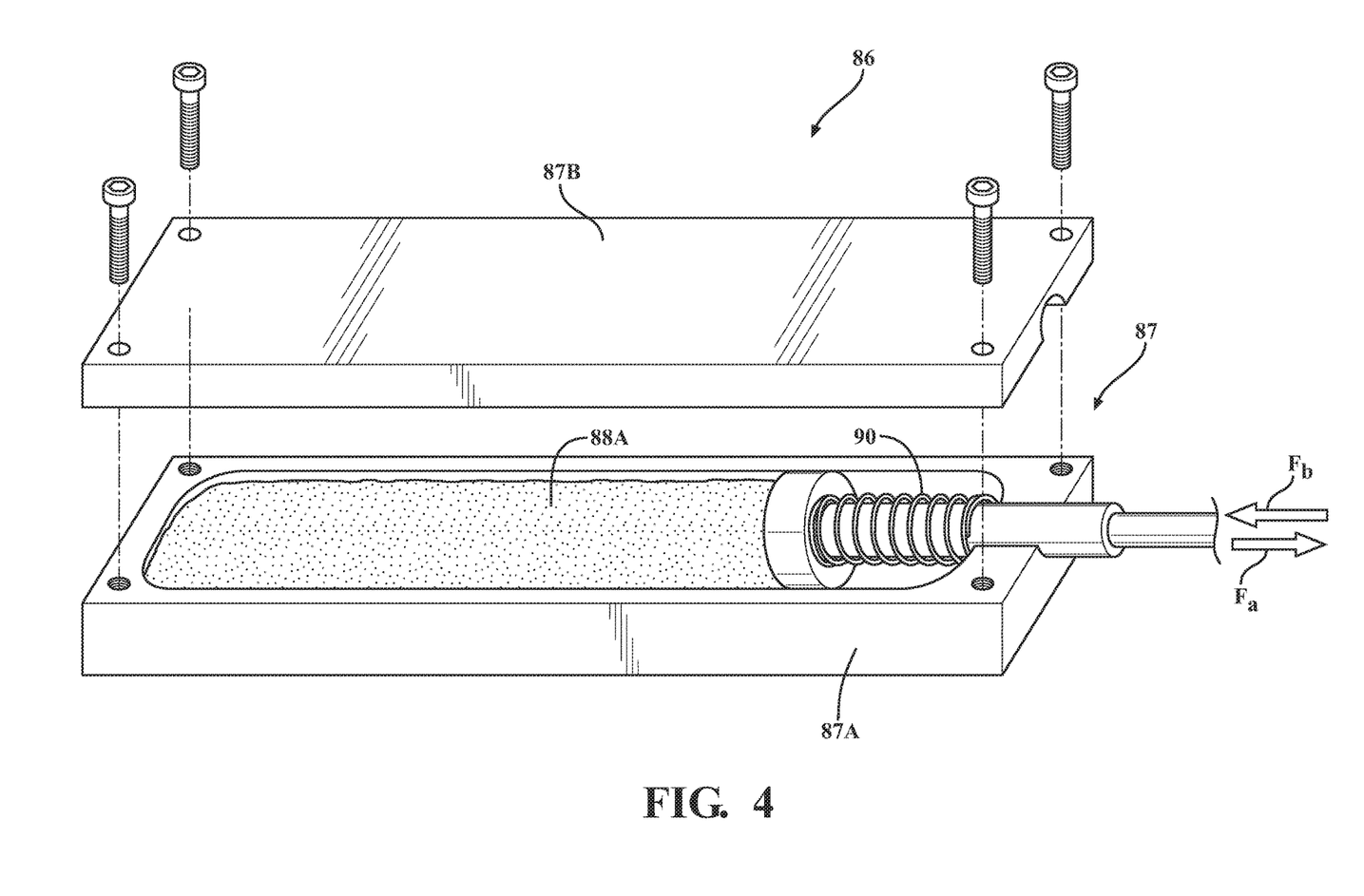
FIG. 4 is a schematic close-up illustration of internal components of an embodiment of the actuator shown in FIGS. 1-3.
Figure 5:
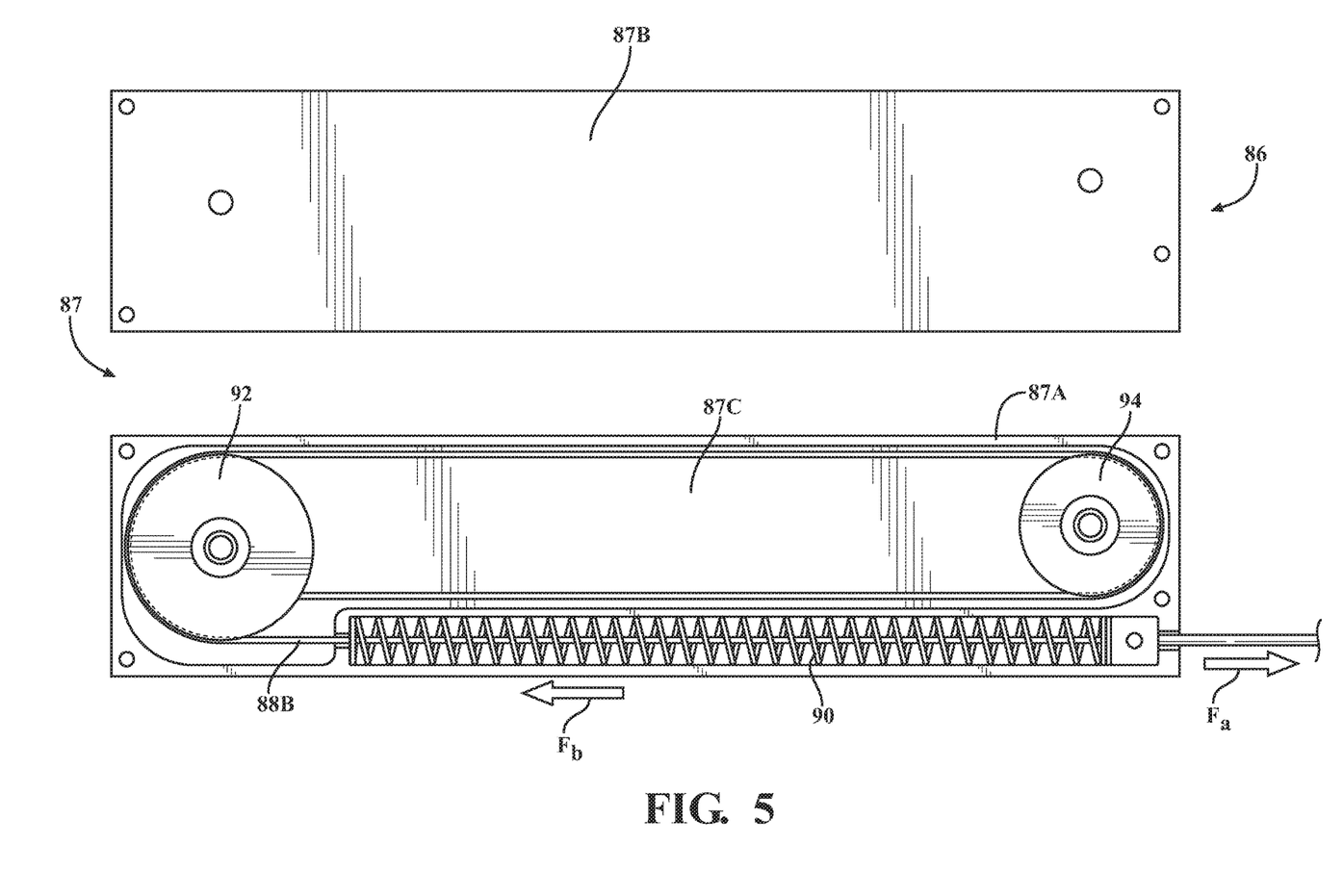
FIG. 5 is a schematic close-up partially disassembled illustration of internal components of another embodiment of the actuator shown in FIGS. 1-3.

The actuator 86 is arranged at the brake subassembly 62 and configured to select a position for the valve 84 between and inclusive of fully-opened (shown in FIG. 3) and fully-closed (shown in FIG. 4) in response to a temperature of the brake subassembly. The passive airflow regulation system 80 can include an individual duct 82 with the valve 84 and the actuator 86 positioned at each of the front and rear wheels 32A, 32B. As shown in FIGS. 4 and 5, the actuator 86 can include a housing 87 configured to mount and retain internal components thereof, and specifically the phase-change element. The housing 87 may include a first housing portion 87A and a second housing portion 87B, together configured to define an enclosed space 87C, wherein the phase-change element 88 is accommodated within the subject space. As shown in FIG. 4, the phase-change element 88 can be a wax 88A, for example, a paraffin wax, such that the actuator 86 operates as a wax motor. In the case of the wax 88A, energy is absorbed or released when the material changes from solid to liquid and vice versa while melting and solidifying at a certain temperature. In the wax motor embodiment of the actuator 86, selective expansion and contraction of the wax 88A can be used to convert thermal energy to mechanical energy as the wax initially heats up and melts and then cools off and solidifies over a predetermined temperature range. Accordingly, the wax motor type of actuator 86 can be operatively connected to the valve 84 and configured to selectively expand and contract in response to changes in temperature of the brake subassembly 62, and specifically of the rotor 64.

Figure 6:
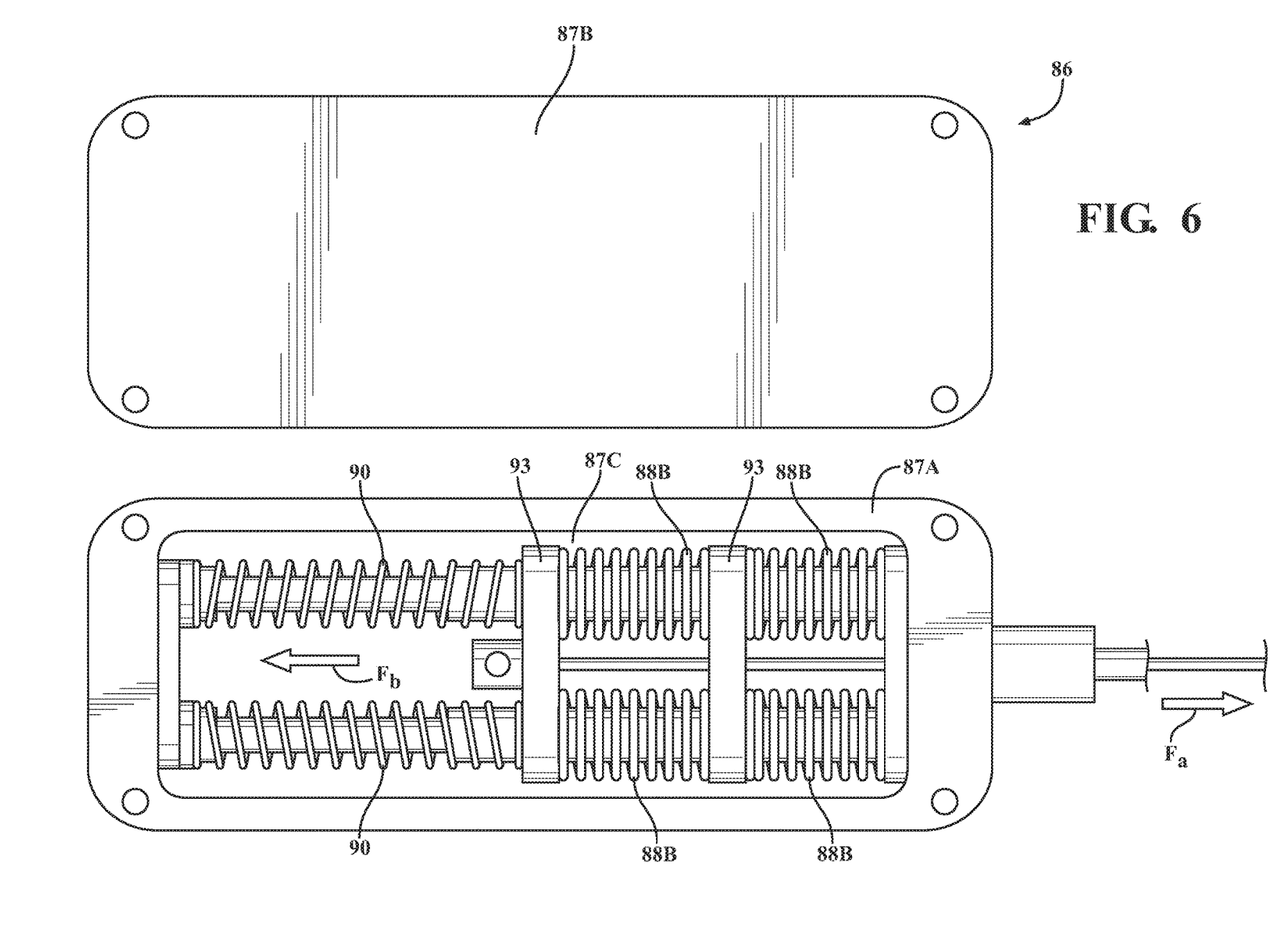
FIG. 6 is a schematic close-up partially disassembled illustration of internal components of yet another embodiment of the actuator shown in FIGS. 1-3.

In an alternative embodiment shown in FIG. 5, the actuator 86 can employ a phase-change element 88 formed from a shape memory alloy (SMA) 88B, such as copper-aluminum-nickel and nickel-titanium. Typically, an SMA, also known as smart metal or alloy, is an alloy that "remembers" its original shape and, after being deformed, returns to its pre-deformed shape when heated. Similar to wax 88A in the wax motor embodiment of actuator 86, the SMA 88B can be used to convert thermal energy to mechanical energy as the SMA initially heats up and extends and then cools off and contracts over a predetermined temperature range. As also shown in FIG. 3, the actuator 86 can additionally include a bias spring 90 configured to generate a bias force $F_b$. As shown, the SMA 88B can be configured or formed as a wire, which may be straight or coiled, and arranged in series with the bias spring 90. The SMA 88B can then be operatively connected to the valve 84 and configured to selectively extend and contract in response to changes in temperature of the brake subassembly 62, and specifically of the rotor 64. Accordingly, in such an embodiment the bias force $F_b$ of the bias spring 90 can be configured to counter one of expansion and contraction of the SMA 88B. In an alternative embodiment shown in FIG. 6, the SMA 88B can be configured as a plurality of wire coils, which could be separated by individual dividers 93 and arranged in series with one or more bias springs 90. As shown in FIG. 4, the wax motor 88A embodiment of the phase-change element 88 can similarly include the bias spring 90 to generate bias force $F_b$ for countering the expansion or contraction of the wax motor.

The actuator 86 employing the SMA 88B may also include a first pulley 92 and a second pulley 94 (shown in FIG. 5). As shown, the SMA 88B extends around the pulleys 92, 94. In such an embodiment, each of the first and the second pulleys 92, 94 is configured to change a directional path of the wire, such that the SMA 88B can exert a force $F_a$ to actuate the valve 84. Furthermore, the pulleys 92, 94 permit a dimensionally compact packaging of the actuator 86 employing the SMA 88B having sufficient length to generate appropriate displacement and actuation of the valve 84. Accordingly, the force $F_a$ operates opposite the bias force $F_b$ exerted by the bias spring 90. In the specific embodiment shown in FIG. 5, actuator housing 87 is configured to mount and retain the SMA 88B, the bias spring 90, and the pulleys 92, 94 therein.

With resumed reference to FIGS. 1-3, in the embodiment where the heat-absorbing subassembly is the brake subassembly 62, the brake assembly can include a brake rotor shield 96 arranged proximate, such as within 2-10 mm, to the rotor 64 and fixed relative to the vehicle body 14. The brake rotor shield 96 can be configured as a disc brake rotor shield (as shown in FIG. 2). As understood by those skilled in the art, the brake rotor shield 96 is generally configured to protect the rotor 64 form various road-borne debris and protect nearby components from heat energy radiated by the rotor. As shown in FIG. 3, the brake rotor shield 96 can also be configured as a drum brake rotor backing plate, which, in part, serves a similar shielding function. As shown in FIGS. 2 and 3, the actuator 86 can be mounted to the brake rotor shield 96. Specifically the rotor shield 96 can define an aperture 98 (shown in FIGS. 2 and 3) having dimension specifically selected to accept and accommodate outer dimensions of the actuator housing 87. Such mounting of the actuator 86 at the brake rotor shield 96 assures that the phase-change element, whether configured as the wax motor 88A or the SMA 88B, responds to the heat energy given off by the rotor 64 to activate the valve 84 and open a path for the incident ambient airflow 25 to cool the brake rotor.

Overall, the passive airflow regulation system 80 can enhance aerodynamic characteristics for the vehicle 10 for improved energy efficiency and reduced noise by maintaining the valve 84 in fully or nearly closed state at elevated road speeds. On the other hand, the passive airflow regulation system 80 can generate on-demand airflow for cooling of the heat-absorbing subassembly, e.g., the brake subassembly 62. Accordingly, the common compromise of efficient brake cooling at the expense of reduced vehicle efficiency can be avoided.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A passive airflow regulation system for controlling temperature of a brake assembly configured to decelerate a vehicle having a vehicle body including a first vehicle body end configured to face an incident ambient airflow via retarding rotation of the vehicle's road wheel, the passive airflow regulation system comprising:
    a duct configured to provide a conduit for the incident ambient airflow to the brake assembly;
    a valve configured to control passage of the incident ambient airflow through the duct; and
    an actuator employing a phase-change element configured to selectively store and release energy in response to changes in temperature and stress, wherein the actuator is arranged at the brake assembly and configured to select a position for the valve between and inclusive of fully-opened and fully-closed in response to the temperature of the brake assembly;
    wherein:
        the brake assembly includes a brake rotor configured to rotate with the road wheel;
        a brake rotor shield defining an aperture configured to accept and accommodate outer dimensions of the actuator is arranged proximate to the rotor and fixed relative to the vehicle body; and
        the actuator is mounted to the brake rotor shield at the aperture to thereby respond to a heat energy given off by the rotor and activate the valve.

2. The passive airflow regulation system according to claim 1, wherein the actuator is a wax motor and the phase-change element is a wax.

3. The passive airflow regulation system according to claim 1, wherein the phase-change element is formed from a shape memory alloy (SMA).

4. The passive airflow regulation system according to claim 3, further comprising a bias spring configured to generate a bias force, wherein the phase-change element is operatively connected to the valve and configured to selectively extend and contract in response to the temperature of the brake assembly, and wherein the bias force of the bias spring is configured to counter one of expansion and contraction of the phase-change element.

5. The passive airflow regulation system according to claim 3, wherein the phase-change element is configured as a coil arranged in series with the bias spring.

6. The passive airflow regulation system according to claim 3, wherein the actuator includes at least one pulley and the phase-change element is configured as a wire extending around the at least one pulley.

7. The passive airflow regulation system according to claim 6, wherein the at least one pulley includes a first pulley and a second pulley, and wherein the first and second pulleys are each configured to change a directional path of the wire.

8. The passive airflow regulation system according to claim 6, wherein the actuator includes a housing configured to mount and retain the phase-change element, the bias spring, and the at least one pulley therein.

9. A vehicle comprising:
    a vehicle body including a first vehicle body end configured to face an incident ambient airflow;
    a road wheel;
    a brake assembly including a brake rotor configured to rotate with the road wheel and configured to decelerate the vehicle via retarding rotation of the road wheel;
    a brake rotor shield defining an aperture configured to accept and accommodate outer dimensions of an actuator is arranged proximate to the rotor and fixed relative to the vehicle body;
    a duct arranged on the vehicle body and configured to provide a conduit for the incident ambient airflow to the brake assembly;
    a valve configured to control passage of the incident ambient airflow through the duct; and
    the actuator employing a phase-change element configured to selectively store and release energy in response to changes in temperature and stress,
    wherein the actuator is mounted to the brake rotor shield at the aperture and configured to select a position for the valve between and inclusive of fully-opened and fully-closed in response to a heat energy given off by the rotor and activate the valve.

10. The vehicle according to claim 9, wherein the actuator is a wax motor and the phase-change element is a wax.

11. The vehicle according to claim 9, wherein the phase-change element is formed from a shape memory alloy (SMA).

12. The vehicle according to claim 11, further comprising a bias spring configured to generate a bias force, wherein the phase-change element is operatively connected to the valve and configured to selectively extend and contract in response to the temperature of the brake assembly, and wherein the bias force of the bias spring is configured to counter one of expansion and contraction of the phase-change element.

13. The vehicle according to claim 11, wherein the phase-change element is configured as a coil arranged in series with the bias spring.

14. The vehicle according to claim 11, wherein the actuator includes at least one pulley and the phase-change element is configured as a wire extending around the at least one pulley.

15. The vehicle according to claim 14, wherein the at least one pulley includes a first pulley and a second pulley, and wherein the first and the second pulleys are each configured to change a directional path of the wire.

16. The vehicle according to claim 14, wherein the actuator includes a housing configured to mount and retain the phase-change element, the bias spring, and the at least one pulley therein.

* * * * *